United States Patent
Smith

(12)
(10) Patent No.: US 6,547,114 B2
(45) Date of Patent: Apr. 15, 2003

(54) MOTORCYCLE LUGGAGE

(76) Inventor: Duane M. Smith, 17795-22$^{nd}$ St., Mayer, MN (US) 55360

( * ) Notice: Subject to any disclaimer, the term of this patent is extended or adjusted under 35 U.S.C. 154(b) by 0 days.

(21) Appl. No.: 09/784,382

(22) Filed: Feb. 15, 2001

(65) Prior Publication Data

US 2002/0108981 A1 Aug. 15, 2002

(51) Int. Cl.$^7$ .................................................. B62J 7/00
(52) U.S. Cl. ........................ 224/413; 224/417; 224/427; 224/431; 224/585
(58) Field of Search ................................ 224/413, 417, 224/427, 431, 153, 582, 583, 585

(56) References Cited

U.S. PATENT DOCUMENTS

| | | |
|---|---|---|
| 3,515,322 A | 6/1970 | Schneider |
| 4,003,508 A | 1/1977 | Hoops |
| 4,059,207 A | 11/1977 | Jackson |
| D249,036 S * | 8/1978 | Ramalia et al. ............ D12/409 |
| 4,125,213 A | 11/1978 | Watkins |
| D253,269 S * | 10/1979 | Ramalia ..................... D12/409 |
| 4,420,103 A | 12/1983 | Douglass |
| 4,491,258 A | 1/1985 | Jones |
| 4,580,706 A | 4/1986 | Jackson |
| 4,629,040 A | 12/1986 | Jones |
| 4,648,121 A | 3/1987 | Lowe |
| 5,154,332 A | 10/1992 | Williams |
| D348,041 S | 6/1994 | Lovett |
| 5,405,068 A | 4/1995 | Lovett |
| D360,182 S | 7/1995 | Lovett |
| D420,792 S * | 2/2000 | Sakelliou et al. ............ D3/216 |
| 6,029,875 A | 2/2000 | Johnston |
| 6,109,404 A | 8/2000 | Bishop |
| 6,123,239 A | 9/2000 | Lovitt |

* cited by examiner

Primary Examiner—Stephen K. Cronin
(74) Attorney, Agent, or Firm—Gerald E. Helget; Nelson R. Capes; Briggs and Morgan

(57) ABSTRACT

Motorcycle luggage for removeable attachment to a motorcycle's sissy bar. The luggage has a first storage bag with a removable pocket attacheable to the first storage bag. The removable pocket securely engages the sissy bar. The pocket may be manufactured in a number of sizes to fit various size sissy bars, and may also be adjustable within a given size to fit various sissy bars. The first storage bag is collapsible when not in use. A second storage bag may be removably attached to the first storage bag.

13 Claims, 5 Drawing Sheets

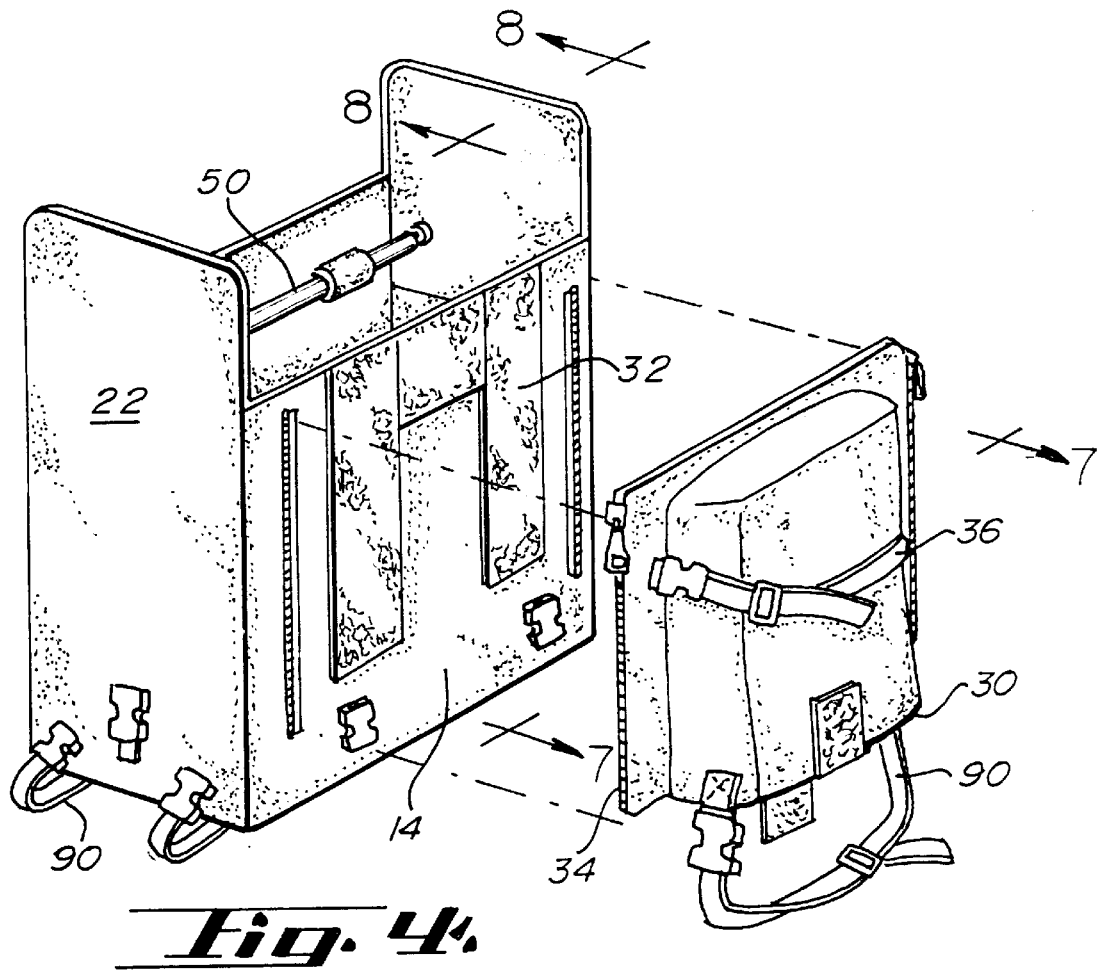
Fig. 4.
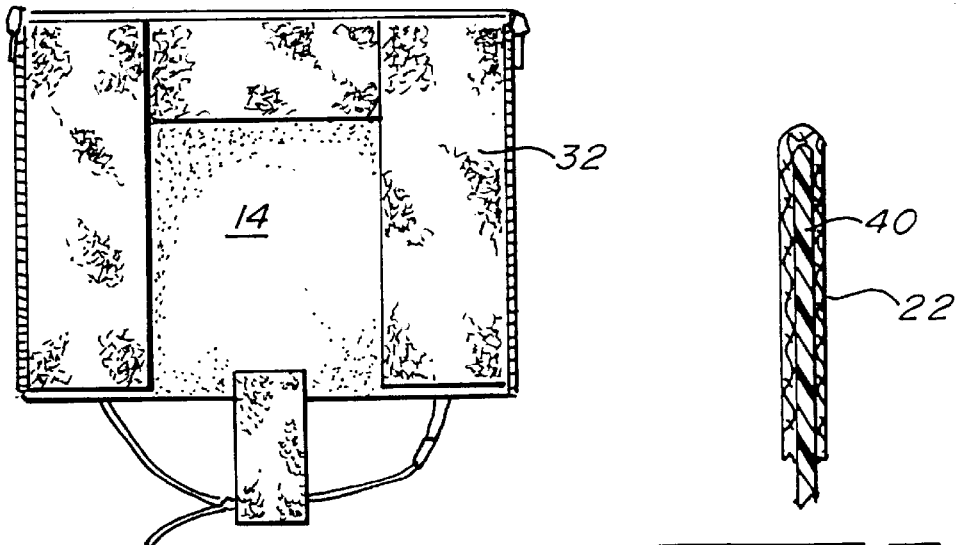
Fig. 7.
Fig. 8.

MOTORCYCLE LUGGAGE

BACKGROUND OF THE INVENTION

1. Field of the Invention

This invention relates to a luggage container for use with motorcycles and, more specifically, to a bag that can be removably attached to a motorcycle by means of a removable pocket, attached to one surface of the bag, which fits snugly over the rear seat of the cycle. The removable pocket can be of various sizes, to accommodate the seat backs or sissy bars of various manufacturers' motorcycles.

2. Description of Related Art

A number of different bag designs have been developed to cope with the problems of attaching luggage to a motorcycle. An ideal luggage bag for a motorcycle would be capable of carrying a large and variable volume of items and would be easy to attach securely to and easy to remove from the motorcycle. Today many motorcycles have a vertically oriented seat back or, alternatively, a vertical tubular frame (sissy bar) behind the main seat. These structures may separate the seat from a rear luggage rack and may also serve as a seat back for a passenger seated behind the motorcyclist.

A number of bag designs have used the sissy bar, the passenger seat back, or the luggage rack to the rear of the seat area as points of attachment for a bag. For example, U.S. Pat. Nos. 4,003,508; 5,405,068; 5,123,239; D348,041; and D360,182. While these patents all show attachment of luggage to the sissy bar or the passenger seat back, they have the common problem of not being adjustable for different sissy bar or seat back sizes. Consequently, the owner must purchase an entirely new piece of luggage if and when he changes to a different motorcycle. U.S. Pat. No. 6,123,239 discloses an adjustable attachment system for a motorcycle bag, but requires a series of straps to attach the bag to the sissy bar, making it time consuming to attach and remove the bag. Also, the straps must be lengthened or shortened to accommodate various size seat backs or sissy bars.

Another desirable feature of motorcycle luggage is that it be collapsible when removed from the motorcycle, for storage. Yet while mounted on the motorcycle, the luggage must have firm bracing that keeps its expanded shape. None of the above patents disclose this necessary feature.

OBJECTS AND SUMMARY OF THE INVENTION

It is an object of the present invention to provide a travel bag for a motorcycle that can be easily attached and removed from the cycle;

It is a further object of the present invention to ensure that the attachment of the bag to the cycle is secure and will not "windmill" or vibrate during cycle operation; and It is an additional object of the present invention to provide a travel bag with a large and expandable storage capacity.

It is an additional object of the present invention to provide a travel bag with a separate, attachable second compartment that sits on top of the first compartment.

It is an additional object and advantage of the present invention to provide a travel bag with a removable pocket that attaches to the seat back or sissy bar of a motorcycle.

It is an additional object and advantage of the present invention that the removable pocket may be made in various sizes to accommodate the seat backs or sissy bars of motorcycles of various manufacturers.

It is an additional object and advantage of the present invention to provide a travel bag that is collapsible when not being used.

It is an additional object and advantage of the present invention to provide a travel bag that has removable, internal reinforcements to prevent inadvertent collapse.

These and other related objects have been met by making a bag that bears an external pocket on the surface of the bag that faces the front of the cycle. This pocket is sized to fit snugly over the rear passenger seat back. The pocket is located on the bag so that the bottom of the bag will just rest on the luggage rack when the seat back is completely inserted into the pocket. Although the snug pocket stably attaches the bag, straps are provided to further engage the seat back members or the luggage rack members to ensure that the bag will not come loose during use. The pocket is removable and replaceable with other pockets to accommodate the seat backs of various manufacturers' motorcycles.

Additional storage capacity is provided by attaching a second storage bag to the first on top of the first storage bag. Extra capacity cannot be provided by simply making the bag oversize, since a loosely-filled bag will vibrate and flap when the cycle is in motion. Attaching the second storage bag on top of the first, rather than in front of or behind the first, has the additional advantage of not taking up scarce room on the motorcycle.

The main bag is collapsible when not in use by removing a number of internal braces.

BRIEF DESCRIPTION OF THE DRAWINGS

FIG. 4 is a perspective view showing the removable pocket of the storage bag;

FIG. 7 is a rear elevational view of the motorcycle bag with the removable pocket removed, taken along the lines 7 of FIG. 6;

FIG. 8 is a cross-section through the end panels of the bag along the lines 8 of FIG. 6.

DETAILED DESCRIPTION OF THE PREFERRED EMBODIMENT

Figure 1:
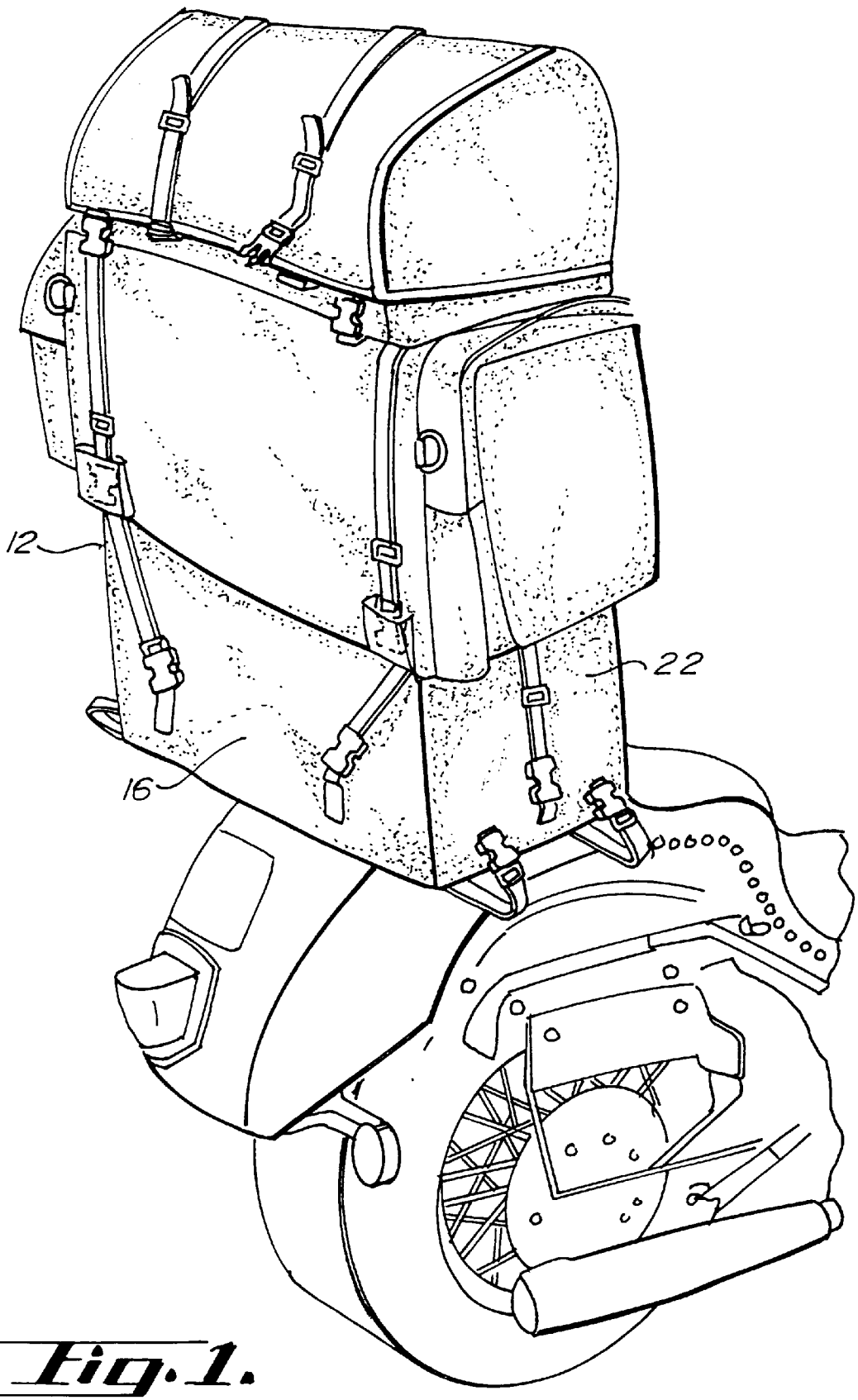
FIG. 1 is a perspective view of a motorcycle bag mounted on the rear of a cycle.
Figure 2:
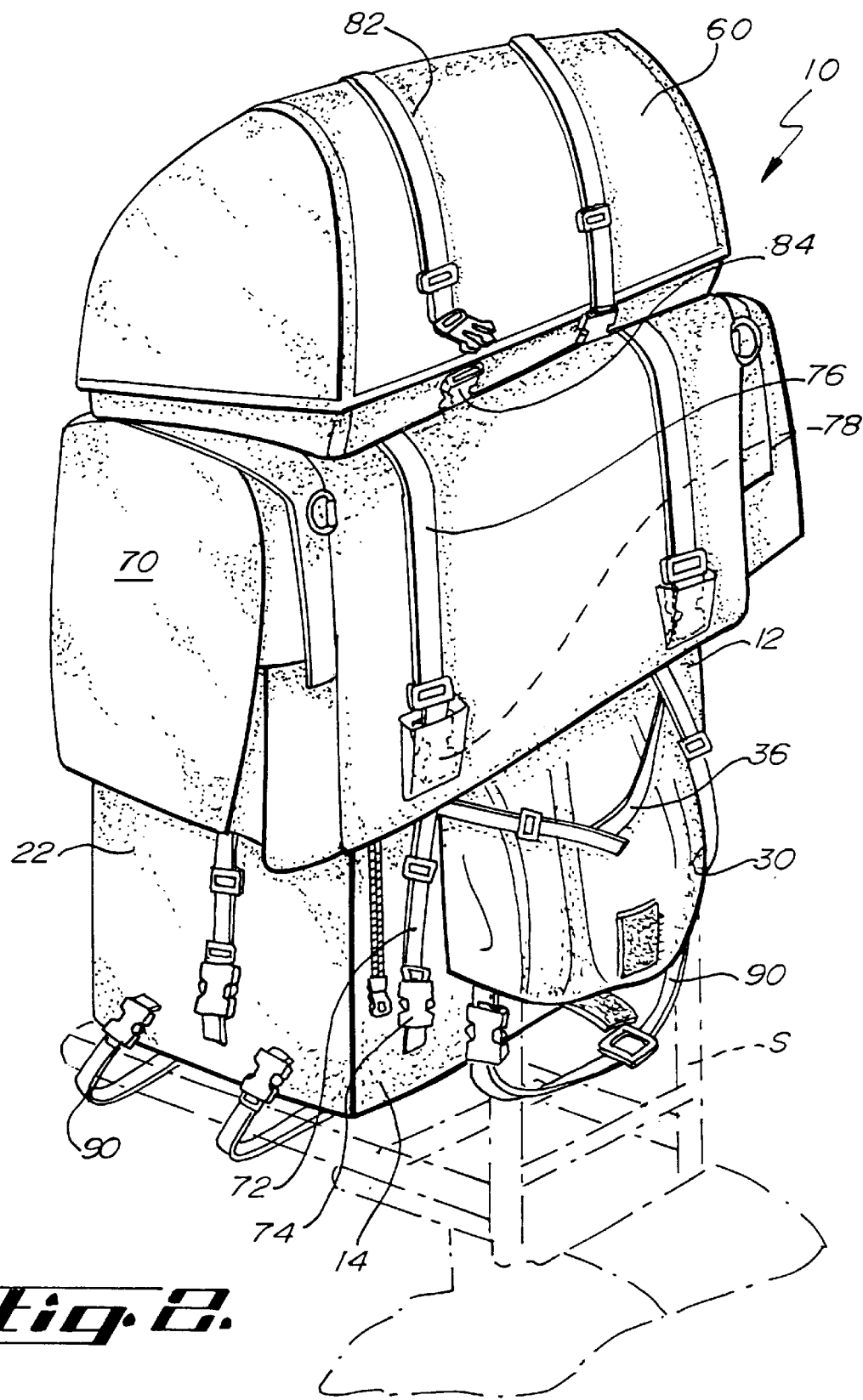
FIG. 2 is a perspective view of the motorcycle bag, showing its attachment to the seat back or sissy bar of a motorcycle.
Figure 3:
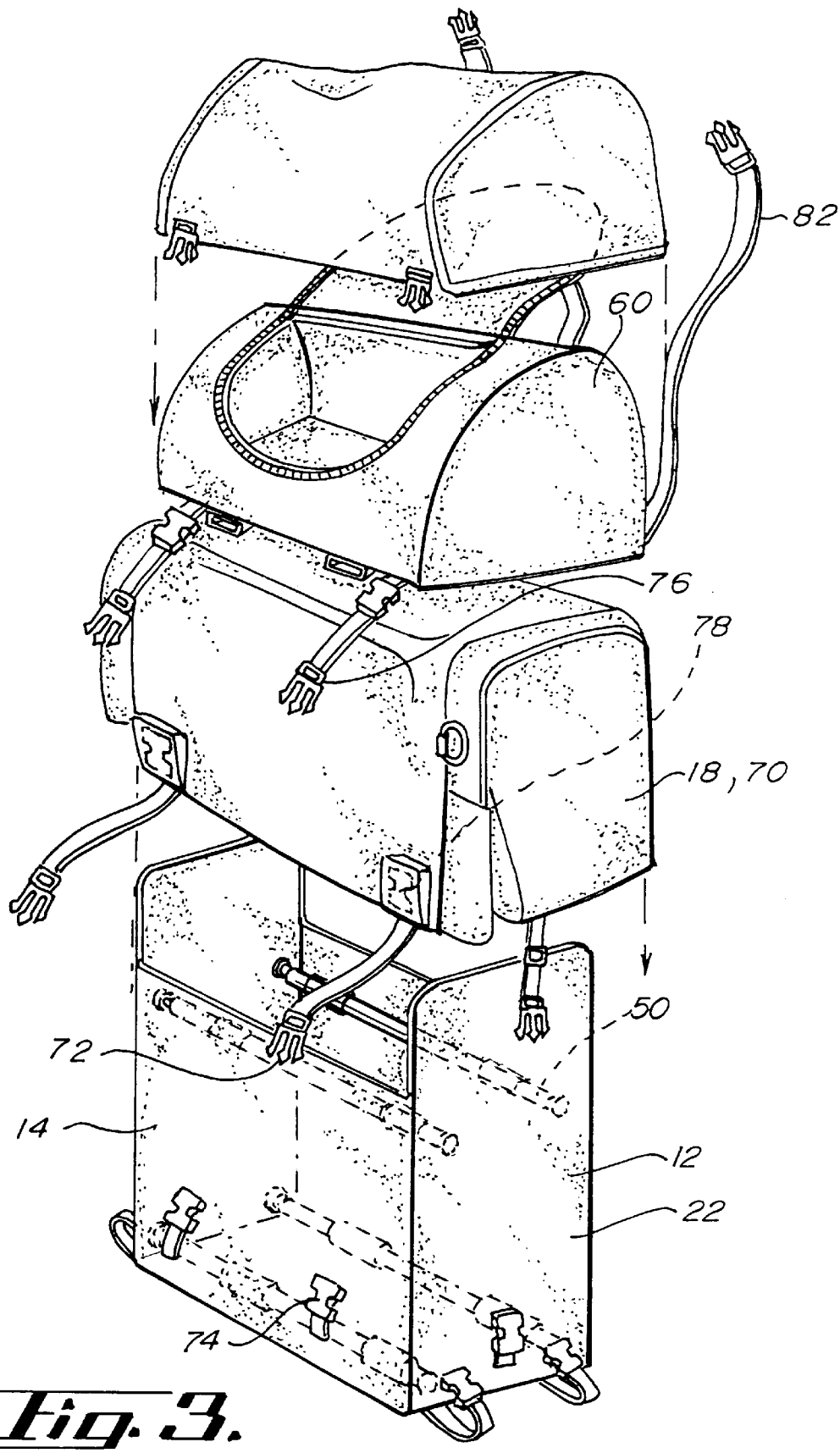
FIG. 3 is an exploded view showing the various components of the motorcycle bag.
Figure 5:
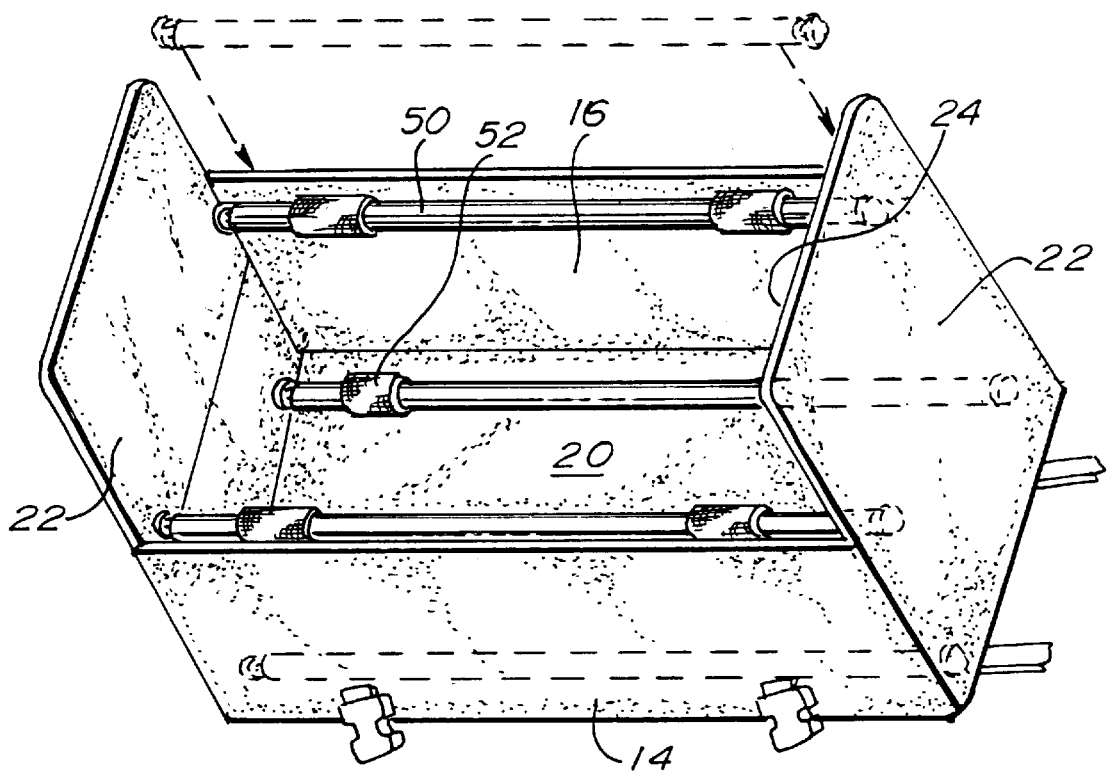
FIG. 5 is a perspective view showing the internal bracing of the bag.

The motorcycle luggage of the present invention is generally shown in the Figures as reference numeral 10.

The motorcycle luggage 10 comprises a first storage bag 12 having a front 14, back 16, top 18, bottom 20, end walls 22 and a storage compartment 24 enclosed therein.

The motorcycle luggage 10 further comprises a removable pocket 30 adapted to tightly engage the motorcycle's seat back or sissy bar S. The pocket 30 is removable attached to the first storage bag 12. Preferably, the pocket 30 is attached to the front 14 of the bag 12. The attachment may be made by any method, but most preferably the pocket 30 is attached to the bag 12 with hook and loop fasteners such as Velcro® 32. As is well known, the bag 12 must have matching hook and loop fasteners (not shown). In addition, the pocket 30 may be secured to the bag by a zipper 34.

The pocket 30 may be manufactured in a number of sizes to fit the sissy bars of various models of motorcycles. A given size pocket may also be adjustable to various size sissy bars, such as by an adjustment strap 36 adapted to tighten the pocket 30 about the sissy bar S.

Figure 6:
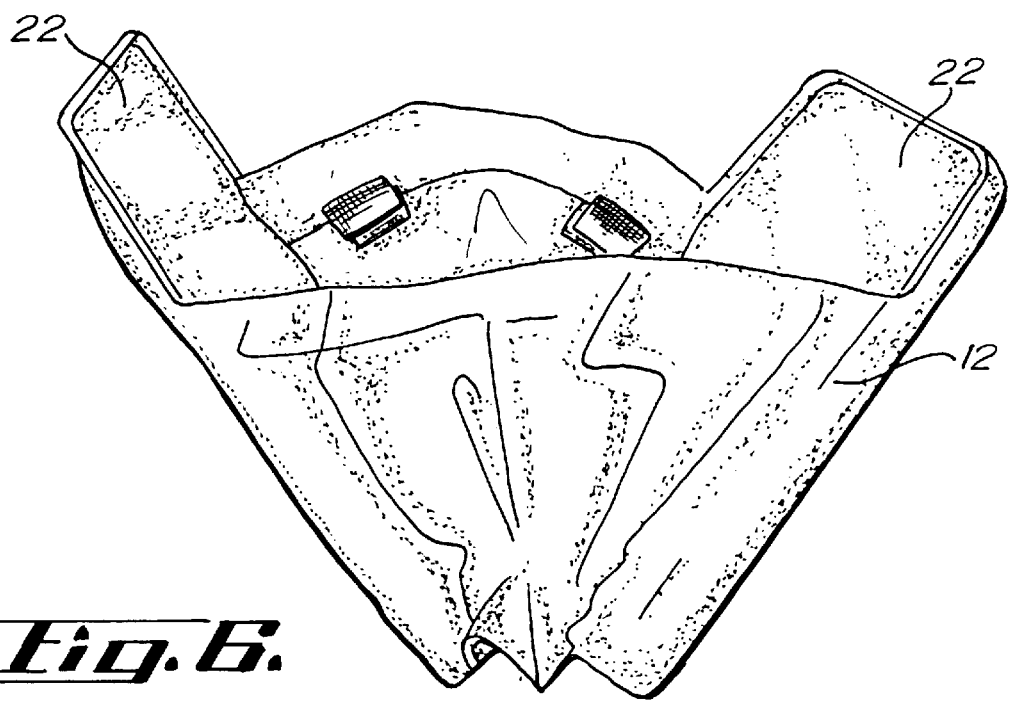
FIG. 6 is side elevational view showing the bag in a partially collapsed condition.

Another desirable feature of the bag 12 is that it is collapsible when not in use. This feature is achieved, while at the same time having the bag firmly braced in its expanded condition, by hard stiffeners 40 embedded in the end walls 22 and a plurality of internal braces 50 engaging the end walls 22 across the storage compartment 24. The internal braces 50 are removable from the bag 12, for example by hook and loop fasteners 52 that mate with corresponding hook and loop fasteners on the bag 12. When the braces 50 are removed, the bag 12 may be collapsed as shown in FIG. 6, with the front 14 and back 16 each folding on itself so that the end walls 22 may be brought together.

An additional feature of the luggage 10 is a second storage bag 60 removably attachable to the first storage bag 12. Preferably, the second storage bag 60 is attached to the top 18 of the first storage bag 12, thus taking up no space on the motorcycle's seat or rack.

The top 18 of the first storage bag 12 may preferable comprise a removable rain hood 70 which may attach to the first storage bag 12 by straps 72 engaging buckles 74. The second storage bag 60 may attach to the rain hood 70 by straps 76 engaging buckles 78.

A second detachable rain hood 80 may attach to the second storage bag 60 by straps 82 and buckles 84.

Various other straps 90 may be used to further secure the luggage 10 to the motorcycle.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. Motorcycle luggage for removable attachment to a motorcycle, the motorcycle having a seat and a rear seat back or a sissy bar in back of the seat, the motorcycle luggage being attachable to the rear seat back or sissy bar, the motorcycle luggage comprising:
   a) a first storage bag having a front, back, top, bottom, end walls and a storage compartment therewithin; and
   b) a removable pocket adapted to tightly engage the motorcycle's scat back, the pocket being removable attached to the first storage bag with hook and loop fasteners.

2. The motorcycle luggage of claim 1, wherein the removable pocket is attached to the front of the first storage bag.

3. The motorcycle luggage of claim 1, further comprising a zipper attaching the removable pocket to the first storage bag.

4. The motorcycle luggage of claim 1, wherein the detachable pocket may be manufactured in several sizes, thereby accommodating the seat backs of various motorcycles.

5. The motorcycle luggage of claim 1, wherein the top of the first storage bag further comprises a detachable rain hood.

6. The motorcycle luggage of claim 5, further comprising a second detachable rain hood that is attachable to the second storage bag.

7. The motorcycle luggage of claim 1, wherein the detachable pocket is adjustable in size, thereby accommodating the seat backs of various motorcycles.

8. The motorcycle luggage of claim 7, further comprising an adjustable strap adapted to tighten the removable pocket amount the motorcycle's seat back.

9. Motorcycle luggage for removable attachment to a motorcycle, the motorcycle having a seat and a rear seat back or a sissy bar in back of the seat, the motorcycle luggage being attachable to the rear seat back or sissy bar, the motorcycle luggage comprising:
   a) a first storage bag having a front, back, top, bottom, end walls and a storage compartment therewithin:
   b) a removable pocket adapted to tightly engage the motorcycle's seat back, the pocket being removably attached to the first storage bag; and
   c) a second storage bag removably attachable to the first storage bag wherein the first storage bag is collapsible when not in use.

10. Motorcycle luggage for removable attachment to a motorcycle, the motorcycle having a seat and a rear seat back or a sissy bar in back of the seat, the motorcycle luggage being attachable to the rear seat back or sissy bar, the motorcycle luggage comprising:
   a) a first storage bag having a front, back, top, bottom, end walls and a storage compartment therewithin;
   b) a removable pocket adapted to tightly engage the motorcycle's seat back, the pocket being removably attached to the first storage bag; and
   c) a second storage bag removably attachable to the first storage bag.

11. The Motorcycle luggage of claim 10, wherein the second storage bag is attached to the top of the first storage bag.

12. Motorcycle luggage for removable attachment to a motorcycle, the motorcycle having a seat and a real scat back or a sissy bar in back of the seat, the motorcycle luggage being attachable to the real seat back or sissy bar the motorcycle luggage comprising;
   a) a first storage bag having a front, back, top, bottom, end walls and a storage compartment therewithin wherein the first storage bag is collapsible when not in use and the first storage bag further comprises a hard stiffener embedded in each end wall of the bag and a plurality of internal braces engaging the two end walls of the bag across the storage compartment; and
   b) a removable pocket adapted to tightly engage the motorcycle's seat back, the pocket being removably attached to the first storage bag.

13. The motorcycle luggage of claim 12, wherein the internal braces, are removable.

* * * * *